UNITED STATES PATENT OFFICE.

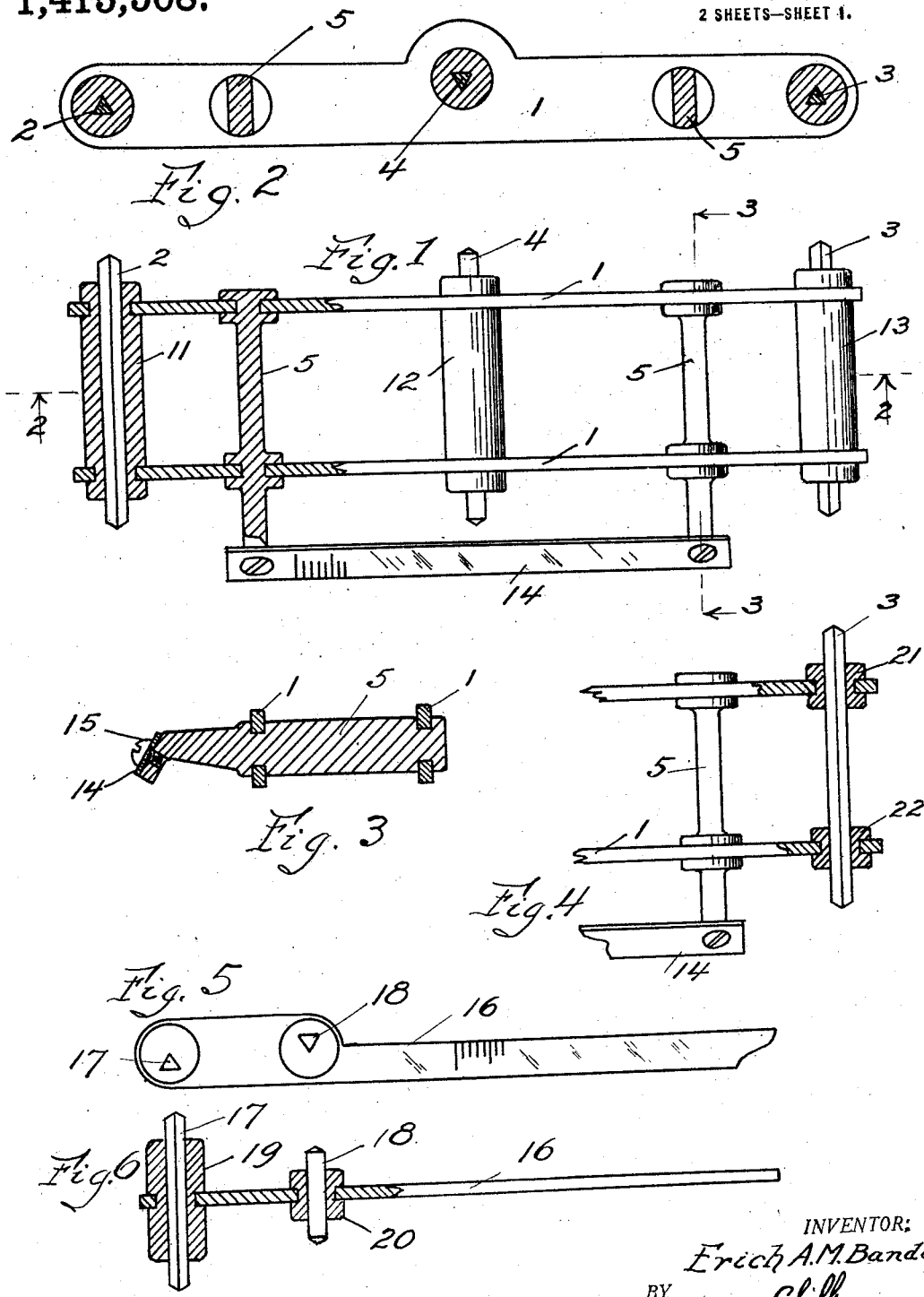

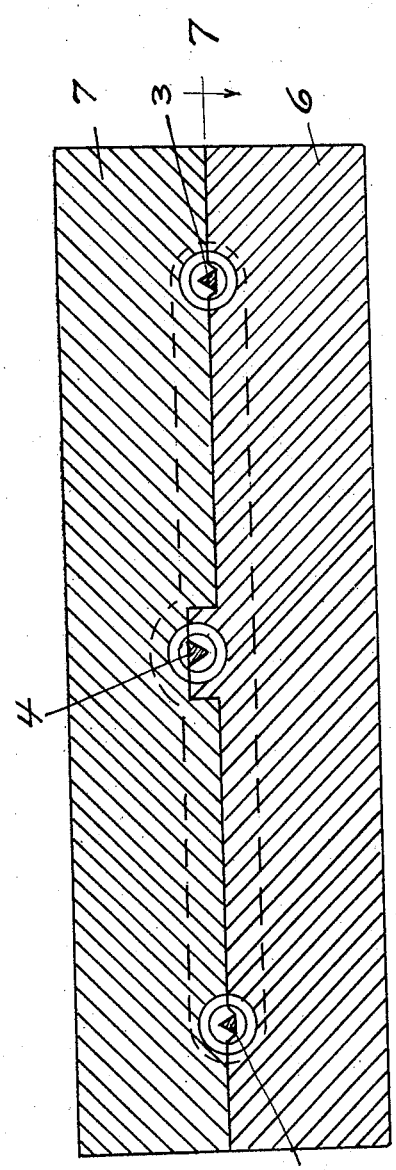
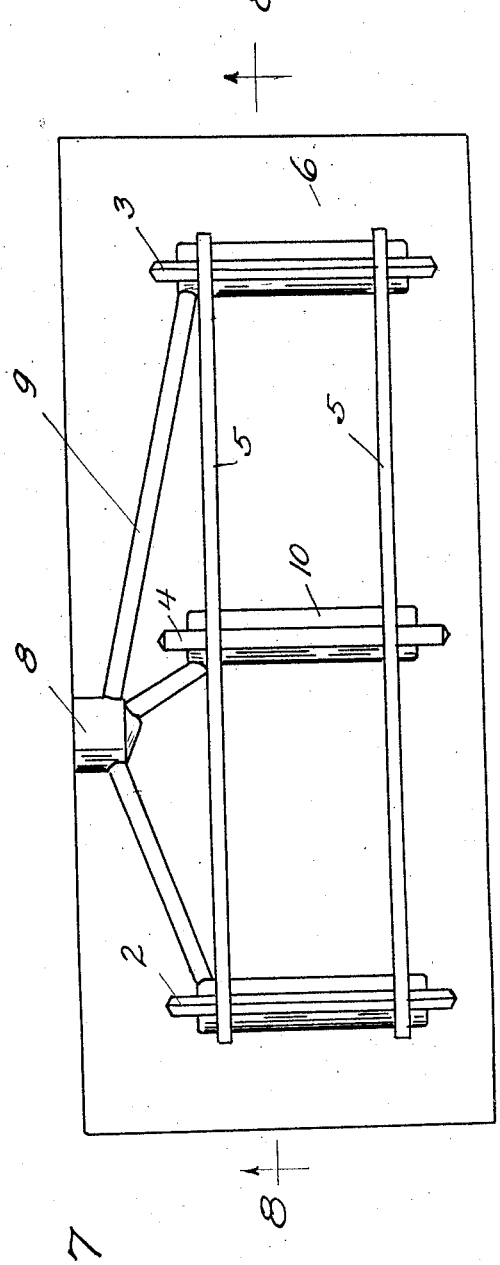

ERICH A. M. BANDOLY, OF CHICAGO, ILLINOIS.

SCALE-BEAM CONSTRUCTION.

1,415,508.

Specification of Letters Patent.

Patented May 9, 1922.

Application filed August 3, 1921. Serial No. 489,409.

*To all whom it may concern:*

Be it known that I, ERICH A. M. BANDOLY, citizen of Germany, residing at Chicago, Illinois, have invented certain new and useful Improvements in Scale-Beam Constructions; and I do hereby declare the following to be a full, clear, and exact description of the invention, such as will enable others skilled in the art to which it appertains to make and use the same.

My invention relates to the beams of balances and scales, its general objects being the providing of a less expensive construction than that commonly employed for scales or balances having a fair degree of accuracy, and the providing of a simple method for manufacturing the same.

In making balances or scales for various commercial purposes and for the use of schools and laboratories, the cost of such appliances depends to a considerable extent on the assemblage of parts comprising the beams, it being important that the bearing members should be accurately spaced and in proper relation to each other. With the constructions commonly in use, the care and accuracy required in fitting the constituent parts of the beam to each other introduces an undesirably high item of cost. To reduce this expense, scale beams and balance beams have been made of a cast material (such as a die-cast metal) or by (die-casting the beam directly) upon the bearing members. However, the alloys suitable for this purpose do not equal bar steel or brass either in rigidity or in appearance and are apt to have blow-holes which will interfere with the properly balanced distribution of the weight of the beam. Moreover, since these holes often are not discernible until the cast beam portion is being machined, a considerable waste of castings is involved, thus increasing the average cost of such beams. Moreover, the differences in the distance of the different cast beam portions from the gates of the mold produce corresponding differences in the density as well as the shrinkage of the metal, which differences may be ample to have a material effect on the accuracy of the scale or balance. It is therefore highly desirable that such beams should be constructed with steel or brass or other drawn metal for the beam portions proper, and my invention aims to accomplish this and to overcome the above mentioned objections while requiring only a minimum of machine work.

More particularly, my invention aims to provide beam constructions employing flat steel, brass or the like for the beam proper and while desirably permitting these parts to be blanked out on an ordinary punch press. It also aims to provide molded or die-cast connections between such beam punchings and other portions of the finished beam, aims to arrange these molded or die-cast connecting elements so that any irregularities in the density or expansion of the same will have an inappreciable effect on the balancing of the beam, and aims to provide simple means whereby the molding or die-casting may be effected while maintaining a high degree of accuracy in the spacing of the bearing members. Still further and more detailed objects will appear from the following specification and from the accompanying drawings in which Fig. 1 is a plan view of a balance beam of the twin beam type embodying my invention, with the portions at one end in section to show the disposition of the constituent parts.

Figs. 2 and 3 are vertical sections through the same beam, taken along the correspondingly numbered lines of Fig. 1.

Fig. 4 is a fragmentary plan view of a similar beam, showing a construction in which separate molded or die-cast bushings are used for connecting a bearing member to the two parallel beam portions.

Fig. 5 is an elevation of a graduated scale beam embodying my invention.

Fig. 6 is a plan view of the scale beam of Fig. 5, partly sectioned to show the connections between the constituent parts.

Fig. 7 is a plan view of the lower half of a mold or die as used in the manufacture of a balance beam of the general type of Fig. 1.

Fig. 8 is a vertical section through the complete mold or die as used for this purpose.

In accomplishing the purposes of my invention after the manner of Figs. 1 to 4 inclusive, I first provide beam portions 1 of strip metal (desirably by blanking these out of steel, brass or bronze or other drawn material) with suitably spaced perforations in the same. That is to say, in case of a twin balance beam, I provide two such punchings, each having suitable perforations corresponding in spacing to the locations of the end bearings 2 and 3, the central bearing 4, and the cross-bars 5 of the proposed beam. Next, I slip the bearing members 2, 3 and 4 through their corresponding perforations and set the resulting assembly into the lower part of the mold or die 6, as shown in Fig. 7. This lower die portion has suitable recesses for holding the said parts in definitely determined positions with each of the bearing members substantially central of the beam perforations through which it extends, and with the knife edges of these bearing members accurately spaced and parallel to one another.

I then place the counterpart portion 7 of the die or mold in position and introduce the desired metal or moldable material through gateways 7 and 9 in the usual manner, so as to cause this metal or other material to fill the various spaces (such as the annular space 10) adjacent to the parts which were set into the die or mold. In the case of the embodiment of Figs. 1 to 4, these spaces include cavities for molding sleeves 11, 12 and 13, each of which embraces one of the bearing members and each of which is larger in diameter than the perforations in the beam punchings 1 through which it extends, so as to afford opposed shoulders between which each of these beam punchings is tightly gripped by the die-cast or molded material when the latter contracts during its cooling. For such a twin beam the molded portions also desirably include cross-bars 5 connecting the two beam punchings and here shown as extending beyond one of the latter to afford projections for supporting a graduated scale 14, which scale is afterwards secured to these projections by screws 15.

In making graduated scale beams of the general type shown in Fig. 5, I proceed in a similar manner by first suitably blanking out a beam punching 16 having a pair of perforations adapted to freely house the bearing members 17 and 18, and then casting a pair of connecting members 19 and 20 respectively through these perforations and around the bearing members housed by the latter. In each case, it will be evident that when the die or mold has once been made with the proper accuracy, the bearing members will automatically be given the desired spacing and parallel relation during the forming of the connecting members, so that no machine work is required for this purpose and so that variations in the size or spacing of the perforations in the beam punching will not effect the spacing and alinement of the bearing members. Consequently, I avoid a large share of the skilled labor heretofore required in the construction of beams of this general class, as the beam when taken out of the die or mold is all ready for the finishing.

Moreover, since the molded or die-cast portions extend transversely of the beam, variations in the shrinkage of different batches of material used for this purpose will not appreciably effect the accuracy of the resulting beam, and since the beam punchings can readily be made out of strip materials free from blow-holes or other faults, I avoid the lack of uniformity which would be encountered if the entire beam were die-cast. So also, since the making of the beam punchings is a simple and rapid operation and since the setting of the parts into the die can be performed by a cheap helper, the entire manufacture can be performed very rapidly and at a cost very much lower than that of the beams heretofore in use, so that I am able to produce beams of considerable accuracy in a very short time and at relatively quite low cost. Moreover, the same die can readily be employed for manufacturing beams of any given size and type with beam punchings of various metals, while the material of which the connecting parts are cast or molded can likewise be varied, so that a quite simple equipment suffices for manufacturing scale beams or balanced beams of this class in a considerably variety. It will also be obvious that various materials might be employed for making the sleeves or bushings, provided that these materials can readily be molded and that they will acquire the proper rigidity when hardening, but I desirably employ a die-casting composition for this purpose so as to produce sleeves or bushings which will unite with the adjacent metal parts while molten and which therefore will grip these parts all the more tightly. An iron casting might also be used with parts machined to fit the die and with the knife edges set into the die in the same manner as above described. This same method might also be employed in computing scale spider beams.

However, while I have illustrated and described embodiments of my invention including certain details of construction and arrangement, I do not wish to be limited to the same, as various changes might obviously be made without departing from the spirit of my invention or from the appended claims. For example, Fig. 4 shows a beam end similar to the right hand end of Fig. 1, but having the end bearing member 3 connected to the two beam punchings by separate bushings 21 and 22.

I claim as my invention:

1. A scale beam comprising a metal beam having a transverse perforation, a bearing member of smaller cross-section than the perforation and extending through the latter, and a molded bushing tightly embracing the portion of the bearing member which extends through the perforation and filling the space between the said member and the wall of the perforation and having opposed shoulders clamping the sides of the beam between them.

2. A scale beam comprising a beam having a transverse perforation, a molded bushing extending through the perforation and having opposed shoulders in tight clamping relation to opposite faces of the beam, and a bearing member extending through the bushing substantially axially of the latter and having the bushing molded in tightly embracing relation thereto.

3. A scale beam comprising a plurality of beam portions having transverse perforations alining with each other in the different beam portions, bearing members respectively extending through the alined perforations in the said beam portions, and connecting elements each extending through the alined perforations in the beam portions and in tight gripping relation both to the latter and to one of the bearing members.

4. A scale beam comprising a plurality of beam portions having transverse perforations, the perforations in the several portions being in alinement, bearing members respectively extending through the alined perforations, and connecting elements each molded upon one of the bearing members and the adjacent beam portion to hold the said beam portion and bearing member in rigidly spaced relation.

Signed at Chicago, Illinois, July 29th, 1921.

ERICH A. M. BANDOLY.